(12) United States Patent
Satou

(10) Patent No.: US 6,948,049 B2
(45) Date of Patent: Sep. 20, 2005

(54) DATA PROCESSING SYSTEM AND CONTROL METHOD

(75) Inventor: Takeshi Satou, Tokyo (JP)

(73) Assignee: Pacific Design Inc., Tokyo (JP)

(*) Notice: Subject to any disclaimer, the term of this patent is extended or adjusted under 35 U.S.C. 154(b) by 504 days.

(21) Appl. No.: 10/175,446

(22) Filed: Jun. 20, 2002

(65) Prior Publication Data

US 2002/0199081 A1 Dec. 26, 2002

(30) Foreign Application Priority Data

Jun. 25, 2001 (JP) ........................................ 2001-191423

(51) Int. Cl.[7] .............................................. G06F 15/00
(52) U.S. Cl. ...................................... 712/34; 712/205
(58) Field of Search .......................... 712/34, 205, 206, 712/24, 229, 230, 232

(56) References Cited

U.S. PATENT DOCUMENTS

| | | | |
|---|---|---|---|
| 4,395,758 A | | 7/1983 | Helenius et al. |
| 4,412,303 A | * | 10/1983 | Barnes et al. ............... 712/16 |
| 4,648,034 A | | 3/1987 | Heninger |
| 4,829,420 A | | 5/1989 | Stahle |
| 4,860,191 A | | 8/1989 | Nomura et al. |
| 5,430,850 A | | 7/1995 | Papadopoulos et al. |
| 5,450,553 A | | 9/1995 | Kitagaki et al. |
| 5,487,173 A | | 1/1996 | Greiss et al. |
| 5,495,588 A | | 2/1996 | Gibart et al. |
| 5,699,460 A | * | 12/1997 | Kopet et al. ................ 382/307 |
| 5,717,946 A | * | 2/1998 | Satou et al. ................ 712/225 |
| 5,870,602 A | | 2/1999 | Miller et al. |
| 5,894,582 A | | 4/1999 | Yoshida et al. |
| 5,903,744 A | | 5/1999 | Tseng et al. |
| 6,301,650 B1 | | 10/2001 | Satou |
| 2002/0010848 A1 | | 1/2002 | Kamano et al. |
| 2002/0029330 A1 | | 3/2002 | Kamano et al. |
| 2002/0059510 A1 | | 5/2002 | Yoshimura |
| 2002/0103986 A1 | | 8/2002 | Shimogori et al. |
| 2002/0152061 A1 | | 10/2002 | Shimogori et al. |
| 2002/0198606 A1 | | 12/2002 | Satou |
| 2003/0009652 A1 | | 1/2003 | Satou |
| 2003/0135778 A1 | | 7/2003 | Kitajima |

FOREIGN PATENT DOCUMENTS

| | | |
|---|---|---|
| EP | 0 174 231 A1 | 3/1986 |
| EP | 0 588 341 A2 | 3/1994 |
| EP | 0 628 917 A2 | 6/1994 |
| EP | 0 671 685 A2 | 9/1995 |
| GB | 2 225 881 A | 6/1990 |
| GB | 2 230 119 A | 10/1990 |
| GB | 2 232 514 A | 12/1990 |
| JP | 2000-112585 | 4/2000 |
| JP | 2000-207202 | 7/2000 |
| WO | 95/19006 | 7/1995 |
| WO | 01/44964 A2 | 6/2001 |

OTHER PUBLICATIONS

U.S. Appl. No. 10/320,622, "Data Processing System".
U.S. Appl. No. 10/320,622; "Data Processing System," filed Dec. 17, 2002; First named inventor: Toshiaki Kitajima.

\* cited by examiner

Primary Examiner—Henry W. H. Tsai
(74) Attorney, Agent, or Firm—Burns, Doane, Swecker & Mathis, L.L.P.

(57) ABSTRACT

A data processing system is provided that comprises a special-purpose processing unit (VU), a general-purpose processing unit that is suited to general-purpose data processing unit (PU) and a fetch unit for supplying a special-purpose instruction to the VU and supplying a general-purpose instruction to the PU, wherein the PU is equipped with a first mode for operating based on a first instruction from the fetch unit and a second mode for operating based on a second instruction from the VU. The resources of the PU are made available for use by the VU so that the resources of the PU can be used by the VU with effectively no overheads being required by the transfer of data between the VU and the PU. As a result, a processor with even greater flexibility and faster processing can be provided.

6 Claims, 7 Drawing Sheets

Fig.2

| Direct access | VUDPACMD[7:0] | Operation |
|---|---|---|
| PU register (Rx) read | 100_reg4 | Read data outputted to VUWDATA(1). |
| PU register (Rx) write | 101_reg4 | Data of VURDATA(0) written into a register. |
| PU register (RDx) read | 110_reg3_0 | Read data outputted to VUWDATA(1). |
| PU register (RDx) write | 111_reg3_0 | Data of VURDATA(0) written into a register. |
| Data RAM read | 000_0010 | Data RAM read with VURDATA[15:0](0) as the adress. Read data outputted to VUWDATA(2). |
| Data RAM write | 000_0011 | Write data on VURDATA[31:16] written into data RAM with VURDATA[15:0](0) as the adress. |
| Other | 000_0000 | |

* reg4 represents a 4-bit code in register Rx.
* reg3 represents a 3-bit code in register RDx.

DATA PROCESSING SYSTEM AND CONTROL METHOD

BACKGROUND OF THE INVENTION

1. Technical Field

The present invention relates to a data processing system that is equipped with dedicated circuit.

2. Description of the Related Art

There have been increasing demands for processors that are dedicated to particular applications. In the fields of image processing and network processing, for example, a processor equipping with dedicated circuit that is dedicated to certain processes and special-purpose or dedicated instructions for activating such dedicated circuit flexibly handles the specifications of different applications and is produced with superior cost-performance. The applicant of the present application discloses of such processor in U.S. Pat. No. 6,301,650.

One difficulty when producing a processor that can flexibly handle the specifications of applications according to the user's desired specification is that there is a trade-off between (i) the freedom with which special-purpose instructions (user specified instructions) can be implemented in accordance with user demands and (ii) the ability to execute such special-purpose instructions with low overheads.

The processor disclosed in U.S. Pat. No. 6,301,650 is equipped with one or more special-purpose unit (a special-purpose data processing unit, hereafter referred to as the "VU") and a general-purpose unit (a basic execution unit or processor unit, hereafter referred to as the "PU") that can perform general-purpose processing or basic processing. The processor has, in addition to the general-purpose processing ability supplied by the general-purpose processing unit PU, special-purpose processing ability supplied by dedicated circuit, which is dedicated to processing for performing the user's desired specification and such dedicated circuit can be implemented with an extremely high degree of freedom. Therefore, special-purpose instructions defined by the user can be implemented with an extremely high degree of freedom. In the processor, equipping with registers that are commonly accessed by both the PU and VUs, data transfers between the PU and VUs can be performed by merely executing a register transfer instruction such as a "MOVE" instruction. In this way, the processor has an architecture in which special-purpose instructions, including instructions that exchange data with the PU, can be implemented as VUs with great freedom.

In the fields of image processing and network processing where real-time processing is required, there have been increasing demands in recent years for high-speed processing and real-time processing at a higher processing level. For example, in the above processor that transfers data via registers, when a VU performs data processing on PU data according to a user special-purpose instruction, at least two cycles are required by processing that first transfers the data from the PU and transfers the computation result back from the VU. If the processing performed by the VU consumes a large number of clocks, such as several dozen clocks, the number of clocks consumed by the data transfers between the VU and the PU is relatively low compared to the number of cycles consumed by the processing by the VU, and so is not particularly significant. However, if processing performed by the VU is based on a product-sum operation and is completed in a few clocks, the number of clocks consumed by the data transfers appears as an extremely large overhead.

In particular, when the range of processing that can be executed by special-purpose instructions that are implemented using dedicated circuitry of VU is increased in order to raise the processing speed of the processor, the number of clocks consumed by the processing of each dedicated circuit tends to fall, resulting in a relative increase in the overheads of data transfers.

A method where a common register is equipped with for commonly accessed by a PU and a VU has a wide applicability. However, at least one cycle is consumed when transferring data from an internal register of the PU or VU to the common register used for data transfer, so that a total of four cycles are consumed when data is transferred between the VU and PU and is sent back thereafter. As explained, large improvements in processing speed are expected by reducing the number of clocks consumed by data transfers. However, modifying the configuration of the PU to suit the configuration of the VU sacrifices the general-purpose nature of the PU, thereby reducing the value of the PU as a platform on which a VU of a desired configuration can be implemented in accordance with a user specification. If it becomes necessary to redesign the PU as well, the development period of the processor becomes longer and the cost of the processor increases, so that this is not an economical solution.

The present invention has a first object of providing a data processing apparatus or system and a control method thereof that can reduce the overheads of data transfers between PU and VU without sacrificing the general-purpose nature of the PU. A second object of the present invention is to provide a data processing system and a control method in which processing can be executed by VU without no or little apparent consumption of clock cycles due to data transfers between VU and PU.

SUMMARY OF THE INVENTION

A data processing system according to the present invention comprises: a special-purpose processing unit including dedicated circuitry that is suited to special data processing; a general-purpose processing unit that is suited to general-purpose data processing; and a fetch unit for supplying, when an instruction code fetched from a code memory, is a special-purpose instruction that specifies processing to be performed by the special-purpose processing unit, the special-purpose instruction or a decoded data of the special purpose instruction to the special-purpose processing unit, and supplying, when the fetched instruction code is a general-purpose instruction that specifies processing by the general-purpose processing unit, the general-purpose instruction or a decoded data thereof to the general-purpose processing unit, wherein the general-purpose processing unit is equipped with a first mode for operating based on a first instruction from the fetch unit and a second mode for operating based on a second instruction from the special-purpose processing unit. The general-purpose processing unit is equipped with an execution unit for executing data processing and a control unit for controlling the execution unit based on any of the first instruction and the second instruction.

Also, in this invention, a control method for a data processing apparatus, which is equipped with a special-purpose processing unit, a general-purpose processing unit, and a fetch unit is supplied. The Control method includes a first step in which the general-purpose processing unit operates based on a first instruction from the fetch unit and a second step in which the general-purpose processing unit operates based on a second instruction from the special-purpose processing unit. A program or program product of the invention for the data processing system that includes a special-purpose processing unit and a general-purpose processing unit, supplied by stored in a memory medium, comprises a special-purpose instruction and a general-purpose instruction wherein the special-purpose instruction persuades the special-purpose processing unit to issue an instruction by which the general-purpose processing unit operates the second step instead of the first step in which the general-purpose processing unit operates based on the general-purpose instruction. The instructions supplied from the fetch unit to the special-purpose processing unit and the general-purpose processing unit may be the fetched special-purpose instructions and the general-purpose instructions, or may be decoded data, signals or instructions produced by decoding by the fetch unit.

With the data processing apparatus of the present invention, in the first mode or the first step, the processing of the general-purpose processing unit and the processing of the special-purpose processing unit are executed separately or in parallel at the program level according to general-purpose instructions that is the first instruction and special-purpose instructions respectively supplied from the fetch unit. In the second mode or the second step, processing by the general-purpose processing unit can be performed under the control of the special-purpose processing unit by the second instruction, so that the general-purpose processing unit and the special-purpose processing unit can be synchronized or synchronously operated by one instruction that is a special-purpose instruction. Accordingly, cooperative processing can be performed by the general-purpose processing unit and the special-purpose processing unit, with it being possible to execute processing with some or all of the hardware resources of the general-purpose processing unit as a part of or an extension of a data path of the special-purpose processing unit.

This means that even without data being transferred from the general-purpose processing unit to the special-purpose processing unit via a shared register or the like, the same or shared (cooperative) processing can be performed by a data path composed of resources such as the internal registers of the general-purpose processing unit and resources such as the computing unit of the special-purpose processing unit. As one example, processing where data that is stored in an internal register (general-purpose register) of the general-purpose processing unit is processed by the dedicated circuitry of the special-purpose processing unit and the result is then stored back in the general-purpose register can be executed in the same number of cycles or clocks (except for delays caused when flip-flops or the like are involved) as when the same processing is performed for data that is already present in the special-purpose processing unit. A reduction is made in the number of clocks consumed by data transfers, and commands for data transfers and the like are no longer necessary, so that cycles that are consumed by data transfers can be kept from appearing in the program.

Depending on the specification of the application to be realized by the data processing system of the present invention, the second mode or second step may or may not be required by the special-purpose processing unit. However, if the second mode or second step is implemented as a standard architecture or control command of the general-purpose processing unit, the effects of the present invention can be achieved without sacrificing the general-purpose nature of the general-purpose processing unit as a platform for implementing a special-purpose processing unit that is developed and/or designed according to a specification.

With the data processing apparatus and the control method of the present invention, according to a second instruction from the special-purpose instruction, processing can be performed with the hardware resources of the general-purpose processing unit being used as hardware resources of the special-purpose processing unit. During such processing, the parallelism between the general-purpose processing unit and the special-purpose processing unit is sacrificed, though it becomes possible for the resources of the general-purpose processing unit to be used as part of the dedicated circuitry. For this reason, the processing time taken by data transfers between the special-purpose processing unit and the general-purpose processing unit is no longer a significant factor for the generation of a program and it becomes possible to omit redundant hardware, so that the special-purpose processing unit can be made more compact.

Since the general-purpose circuit components of the general-purpose processing unit can be easily used as part of the dedicated circuitry, a large increase is made in the freedom with which special-purpose instructions can be defined. Also, it is no longer necessary to perform data transfers between the general-purpose processing unit and the special-purpose processing unit as separate processes, so that a large decrease can be made in the overheads caused by data transfers.

With the data processing system or the control method of this invention, a processor or data processing apparatus that has special or dedicated circuit and can flexibly manage the specification of an application can be provided. In response to user demands, which is to say, in response to the user's specification, this processor or data processing apparatus can implement special-purpose instructions (user special-purpose instructions) with great freedom, and can execute such special-purpose instructions either with no overheads or with no apparent overheads.

It is preferable that, when the control unit of the general-purpose processing unit receives a signal requesting the second mode from the special-purpose processing unit prior to a second instruction, the control unit ends the processing in the execution unit based on the preceding first instruction, stores an address for fetching the general-purpose instruction that follows the first instruction, and outputs a signal permitting the special-purpose processing unit to issue the second instruction. It is also preferable for the control method of the present invention to include a third step of ending, when a signal that requests the second step is received from the special-purpose processing unit before the second step starts, the processing of the preceding first instruction, storing an address for fetching a general-purpose instruction that follows the first instruction, and outputting a signal for permitting the special-purpose processing unit to issue the second instruction. By doing so, processing that is executed by the special-purpose processing unit using the hardware resources of the general-purpose processing unit can be completely controlled from the special-purpose processing unit independently of the programmed general-purpose instructions. That is to say, in the program of this data processing apparatus, by merely using a special-purpose instruction, it becomes possible to perform control processing in which the special-purpose processing unit uses the hardware resources of the general-purpose processing unit. In the same way as interrupt handling, when such processing ends, the general-purpose processing unit can resume the processing defined by the general-purpose instructions in the program.

The format of the second instruction supplied from the special-purpose processing unit may be the same as the format of the first instruction supplied from the fetch unit, or a different format may be used. If the second instruction is supplied from the special-purpose processing unit in the same format as the general-purpose instructions (or instructions decoded from the general-purpose instructions) that are supplied by the fetch unit, the general-purpose processing unit can be made to operate under the control of the special-purpose processing unit with only minor changes to the configuration of the control unit of the general-purpose processing unit.

On the other hand, it is possible to provide the control unit with a decode/execution control unit for decoding the first instruction, and a control logic unit for selecting, according to an indication from the decode/execution control unit, one of a third instruction from the decode/execution control unit and the second instruction from the special-purpose processing unit, and converting the selected instruction into a control signal for logical and computing elements that compose the execution unit. In this case, since the second instruction supplied from the special-purpose processing unit is in the same form of data that has already been decoded by the decode/execution control unit of the general-purpose processing unit, the processing cycles of the decode/execution control unit can be reduced or omitted. Accordingly, processing in which the hardware resources of the general-purpose processing unit are used by the special-purpose processing unit can be executed at an earlier stage. The special-purpose processing unit has a specialized circuit configuration that is based on the specification of an application or the like, so that no advantages are gained by outputting instructions in a general-purpose format to the general-purpose processing unit, and it is easy to output the second instruction using form of the data or signal that is executed by the control logic unit.

In this way, in the second mode or the second step, it is possible to make at least some of the hardware resources of the general-purpose processing unit available to the special-purpose processing unit, so that a processor that can process at high speed and is even more suited to real-time processing can be provided at low cost. The advantages of the present invention are especially significant for processing that requires data to be exchanged between the general-purpose processing unit and the special-purpose processing unit, such as processing in which the special-purpose processing unit inputs and outputs data to and from the general-purpose registers of the general-purpose processing unit, processing in which the special-purpose processing unit performs computation using the computing unit of the general-purpose processing unit, and processing in which the special-purpose processing unit inputs and outputs data to and from the data RAM of the general-purpose processing unit. When executing such processing, it is preferable to use the second step. It is also preferable for the execution unit of the general-purpose processing unit that is used as a platform to be provided with at least one of a data path that enables an input/output operation for general-purpose registers to be performed for data from the special-purpose processing unit; a data path that enables an input/output operation for a computing unit of the general-purpose processing unit to be performed for data from the special-purpose processing unit; and a data path that enables an input/output operation for a data RAM of the general-purpose processing unit to be performed for data from the special-purpose processing unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows one example of a direct access command;

DESCRIPTION OF THE PREFERRED EMBODIMENT

Figure 1:
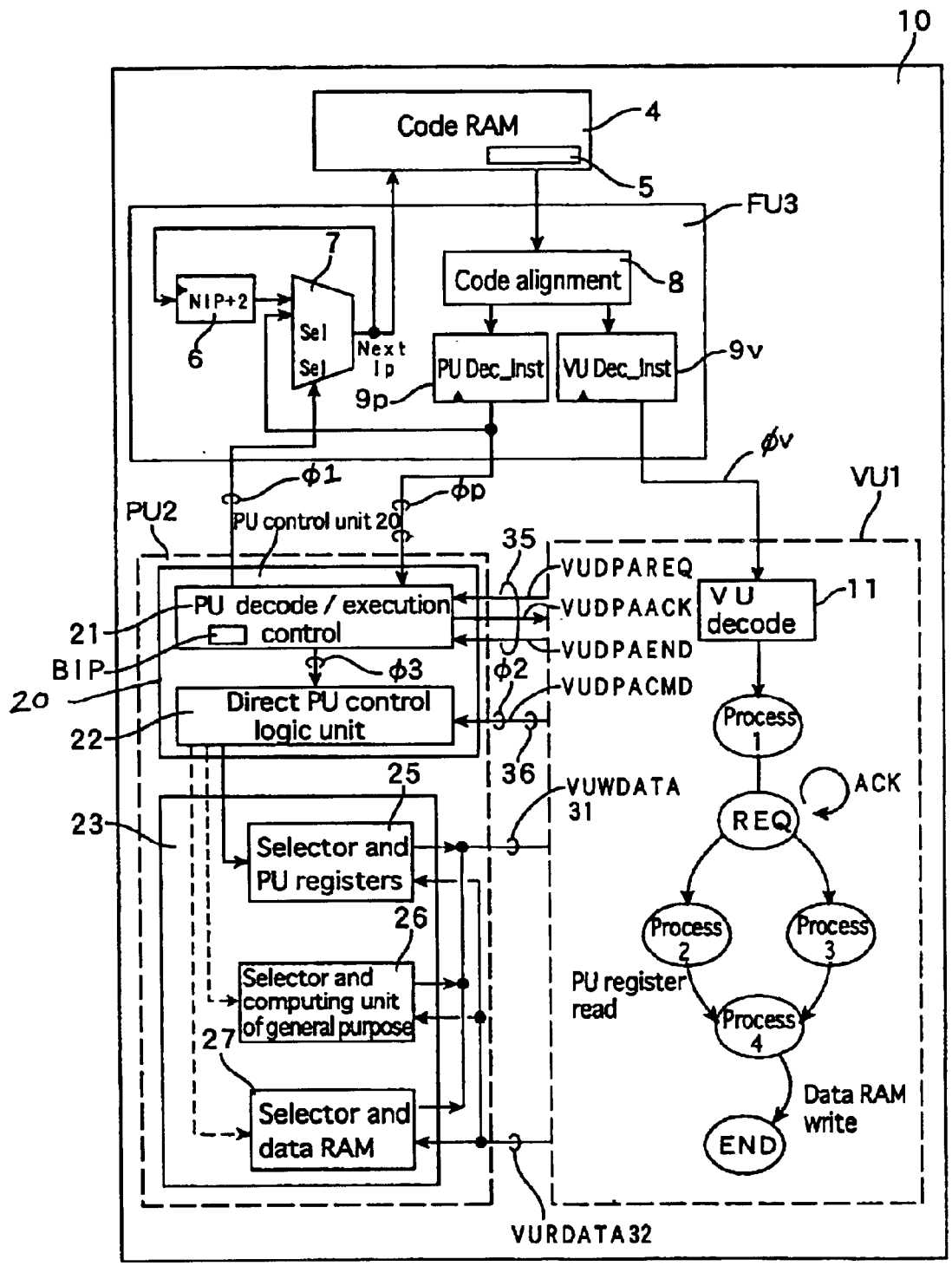
FIG. 1 is a block diagram showing the configuration of a data processing apparatus (processor) according to the present invention.

The following describes the present invention with reference to the attached drawings. FIG. 1 shows the configuration of a data processing system 10. The data processing system 10 is a system LSI (Large Scale Integrated Circuit) or a processor and includes a special-purpose processing unit 1 (a special-purpose data processing unit, hereafter referred to simply as a "VU") that is dedicated to special-purpose processing and a general-purpose processing unit 2 (a general-purpose data processing unit or basic processor, hereafter "PU") with a general-purpose configuration. The processor 10 is also equipped with a fetch unit (hereafter, "FU") 3 that supplies decoded control signals or instructions to the VU 1 and the PU 2. The FU 3 fetches an instruction code (microcode) from executable program code (microprogram code, object code or object program also referred to as the "program") 5 that is stored in a code RAM 4 and outputs the fetched instruction code as a decode stage instruction. The FU 3 is equipped with a register 6 for storing a starting address of the next instruction code, a selector 7 for selecting, in accordance with a control signal φ1 from the PU 2, the address in the register 6 or an address indicated by a decoded instruction φp and outputting the selected address to the code RAM 4 so that the next instruction code is fetched, and a code alignment circuit 8 for aligning the fetched data, judging the type of the instruction code, and outputting the fetched data as a decode stage instruction. In this way, the address of the next instruction code is fed back from the PU 2 and is inputted into the FU 3. The code alignment circuit 8 also functions as a buffer and is also capable of prefetching instruction code when necessary.

The program 5 stored in the code RAM 4 includes special-purpose instructions (hereafter referred to as "VU instructions") that specify processing to be performed by the VU 1 and general-purpose instructions (hereafter, "PU instructions"), that specify processing to be performed by the PU 2. The FU 3 includes a function for decoding the VU instructions and PU instructions and supplying the instructions to the VU 1 and PU 2 respectively. To do so, the FU 3 is equipped with a register 9v =L *for storing a VU decode stage instruction (VU Dec_Inst)* φv that is produced by aligning a fetched instruction code when the fetched instruction code is a VU instruction and a register 9p for storing a PU decode stage instruction (PU Dec_Inst) φp that is produced by aligning a fetched instruction code when the fetched instruction code is a PU instruction. Note that in the following explanation, a VU instruction and the corresponding VU decode stage instruction are described as the VU instruction φv and the PU instruction and the corresponding PU decode stage instruction are described as the PU instruction φp.

The special-purpose processing unit VU 1 executes special-purpose instructions (VU instructions) that are user instructions. The VU 1 is equipped with a decode/execution control circuit 11 that decodes the VU instruction φv and controls the processing in circuitry that is suited to the data processing specified by the VU instruction φv. The VU decode/execution control unit 11 is a circuit that performs the control process in hardware using state transition logic (FSM—Finite State Machine) achieved using a sequencer or other hardware logic circuitry. When a VU instruction φv is supplied, a plurality of processes that are set in advance are executed in the set order. In the VU 1 shown in FIG. 1, data paths (specialized circuits) are provided so that according to a VU instruction φv, the process 1 is executed by the VU 1 alone, the process 2 that uses the general-purpose registers (PU registers) of the PU 2 and the process 3 that uses the resources of the VU 1 are executed, and the process 4 is performed using the data RAM of the PU 2.

The general-purpose processing unit PU 2 is an execution unit for general-purpose instructions and basic instructions. In the present embodiment, the PU 2 is equipped with a PU control circuit 20 for decoding a PU instruction φp and controlling circuitry that includes a general-purpose computational processing unit, such as an ALU (Arithmetic Logic Unit). The PU control circuit 20 in the present example includes a decode/execution control circuit 21 and a direct PU control logic unit 22. The decode/execution control circuit 21 decodes a PU instruction φp and provides control signals or control instructions φ3 that can control the circuit components described below in units of computational processing units or in units of registers. The direct PU control logic unit 22 issues actual instructions or signals in units of computational processing units or registers from the control instruction φ3 supplied by the decode/execution control circuit 21.

As the circuits that perform the general-purpose processing, which is to say, as an execution unit 23, the PU 2 is also provided with a first general-purpose circuit 25, a second general-purpose circuit 26, and a third general-purpose circuit 27. The first general-purpose circuit 25 includes selector logic for switching the input/output data path and can access the general-purpose registers (PU registers). The second general-purpose circuit 26 includes selector logic and flag generation logic and is equipped with a general-purpose computing unit. The third general-purpose circuit 27 includes selector logic and can access a data RAM. By appropriately combining these circuits, a variety of processes can be performed.

Two data buses VURDATA 32 and VUWDATA 31 are provided for data transfers between the VU 1 and the PU 2. The VURDATA data bus 32 and the VUWDATA data bus 31 are both 32 bits (numbered 31 to 0) wide and can each be accessed in 16-bit units (bits 15 to 0 and bits 31 to 16). A first control signal line 35 and a second control signal line 36 are also provided between the VU 1 and the PU 2 so that the VU 1 and the PU 2 can control one another. The first control signal line 35 can exchange control signals between the decode/execution control circuit 21 of the PU 2 and the VU 1. The second control signal line 36 can supply an instruction (the second instruction) φ2 from the VU 1 to the direct PU control logic unit 22.

A resource access request signal VUDPAREQ (hereafter simply "REQ"), an acknowledge signal VUDPAACK (hereafter "ACK"), and a request clear signal VUDPAEND (hereafter "END") are exchanged between the VU 1 and the decode/execution control circuit 21 via the first control signal line 35. The resource access request signal REQ is a control signal that is transmitted from the VU 1 to the PU 2 when the resources of the execution unit 23 are required for the processing executed by the VU 1 according to a VU instruction φv. The acknowledge signal ACK is transmitted from the PU 2 to the VU 1 and is a signal that shows that the PU 2 can be accessed. When the PU 2 receives a resource access request signal REQ, the processing does not proceed to the instruction that follows the PU instruction φp that is being executed, and when processing related to the PU instruction φp that is being executed ends, the fetch address of the next PU instruction φp is stored in the register BIP and an acknowledge signal ACK is transmitted. At this point, when other information, such as a condition code, is required for executing the next PU instruction φp, this information is also saved along with the fetch address in a suitable register.

The request clear signal END is a control signal that is transmitted from the VU 1 to the PU 2 when the processing in the VU 1 that uses the execution unit 23 of the PU 2 ends, so that control over the execution unit 23 of the PU 2 is returned from the VU 1 to the PU 2. Accordingly, when the PU 2 receives a request clear signal END, the address stored in the register BIP is sent to the FU 3 and the next instruction is fetched from the program 5 in the code RAM 4.

An instruction code VUDPACMD (hereafter referred to as the direct access command or the command CMD) that is supplied from the VU 1 to the direct PU control logic unit 22 via the second control signal line 36 is a signal that shows the details of a direct access from the VU 1 to the PU 2. Accordingly, if a PU instruction φp that is supplied to the PU 2 by the FU 3 is a "first instruction", the command CMD corresponds to the "second instruction" of the present invention thereby the VU 1 directly controls the execution unit 23 of the PU 2. The direct access command CMD is supplied to the direct PU control logic unit 22 in parallel with a control instruction φ3 that corresponds to the PU instruction φp (the first instruction φ1) that is supplied from the FU 3. A selection is made by the direct PU control logic unit 22 in accordance with an indication from the decode/execution control circuit 21. A control signal corresponding to the instruction that was selected out of the control instruction φ3 and the command CMD is supplied from the direct PU control logic unit 22 to logical or computing resources such as the computing unit or registers of the execution unit 23, and processing is executed in the execution unit 23.

FIG. 2 shows one example of the command CMD. The command CMD in the present embodiment is an 8-bit instruction and defines a process whereby the VU 1 directly accesses the general-purpose registers (PU registers) of the first general-purpose circuit 25 in the PU 2 and a process whereby the VU 1 directly accesses a data RAM of the third general-purpose circuit 27 in the PU 2. The command CMD may define other processes, such as a process that directly accesses the computing unit of the second general-purpose circuit 26 in the PU 2.

Figure 3:
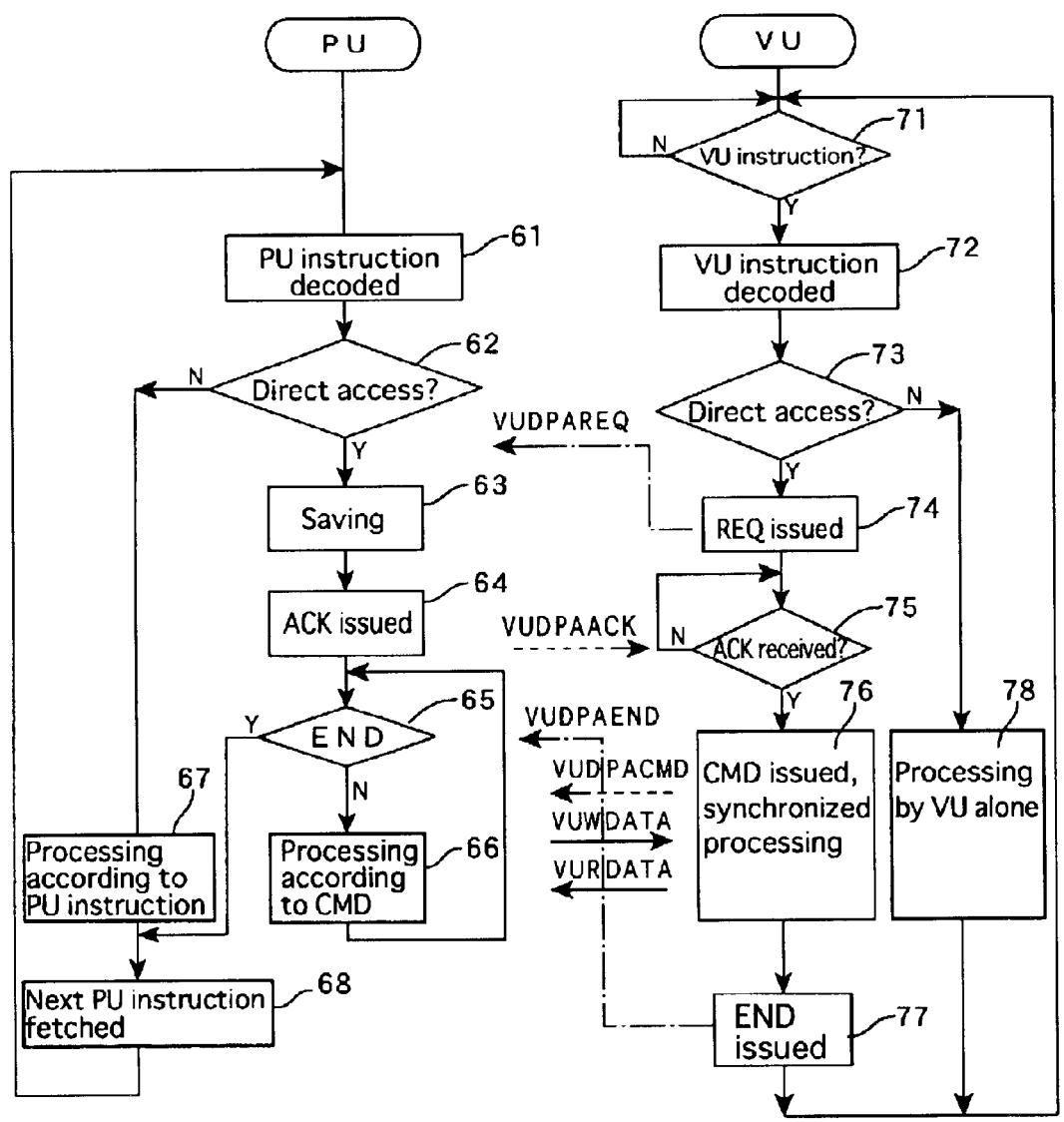
FIG. 3 shows flowcharts of the processing in the PU and the VU.

FIG. 3 shows flowcharts showing the processing in the data processing apparatus 10 when the VU 1 directly accesses the PU 2. FIG. 3 shows the processing of the PU 2 and normally, in step 61, the PU 2 decodes the PU instruction φp supplied from the FU 3 and in step 67 the processing indicated by the PU instruction is executed by the execution unit 23. In step 68, the fetch address of the next PU instruction is outputted and the next PU instruction is supplied from the FU 3. It should be obvious that each of these steps is performed using pipeline processing with the steps being executed in parallel.

In addition to the normal control logic (the first step) described above, the PU 2 of the present embodiment is provided with control logic which saves a fetch address as follows. When there is a direct access request (resource access request) signal REQ from the VU 1 in step 62, in step 63 the control unit 21 of PU 2 waits for processing that is being performed by the execution unit 23 to end and also saves the fetch address of the next PU instruction in the saving register BIP. This control logic (the second step) then issues an acknowledge signal ACK to the VU 1 in step 64, and makes the control over the execution unit 23 available to the VU 1. After this, in step 66, processing is executed by the execution unit 23 according to the direct access command CMD supplied by the VU 1 until the request clear signal END is received from the VU 1 in step 65. Accordingly, until the request clear signal END signal is received, the PU 2 is controlled by the direct access command CMD, so that the PU 2 can be freely controlled from the VU 1 side. When the request clear signal (END signal) is received in step 65, the processing proceeds to step 68 where the fetch address in the saving register BIP is outputted, the next PU instruction is obtained from the FU 3, and the PU 2 returns to executing PU instructions.

In the processor 10 of the present embodiment, when the FU 3 fetches a VU instruction, a "nop" code is supplied to the PU 2 as a PU instruction so as to VU instructions are supplied to the VU 1 and PU instructions are supplied to the PU 2 respectively. In this data processing apparatus (VUPU processor) that includes at least one VU 1 and at least one PU 2, a variety of VU instructions can be implemented according to the specification of an application that is executed by the processor 10, though since the PU 2 is supplied with a "nop" code irrespective of what type of VU instruction is being executed, VUs 1 with a variety of dedicated circuitry can be incorporated into the processor 10 without affecting the general-purpose nature of the PU 2.

In the VU 1, as shown in FIG. 3, it is normally first checked in step 71 whether the instruction supplied from the FU 3 is a VU instruction or decoded data thereof. When this is the case, in step 72 the VU instruction is decoded to control the processing. Next, in step 73 it is judged whether the VU instruction is a direct access instruction that requires the resources of the PU 2. If the VU instruction is not a direct access instruction, in step 78 processing is performed using only the resources of the VU 1.

If the VU instruction is a direct access instruction, namely a VU instruction for direct accessing is included in the program 5 and supplied to the VU 1 via the FU 3, in step 74 a resource access request signal REQ is issued to the PU 2, and in step 75 the receipt of an acknowledge signal ACK from the PU 2 is awaited. Once the acknowledge signal ACK arrives, in step 76 direct access commands CMD are issued to the PU 2 while processing that uses the resources of the PU 2 and the resources of the VU 1 is performed with the VU 1 and PU 2 being synchronized. After this, in step 77 when the processing specified by the VU instruction ends, the request clear signal END is outputted to the PU 2 to release the resources of the PU 2. These signals and commands are outputted by hardware logic such as state transitional logic (an FSM) that is incorporated as the dedicated circuitry of the VU 1.

As described above, with the processor or data processing system LSI 10, VU instructions and PU instructions that compose the program 5 are fetched by the FU 3 in the order in which the instructions are arranged and are supplied to the VU 1 or the PU 2. The processing of the VU 1 and the PU 2 can be suitably controlled by a single program 5, and the processing of the VU 1 and the PU 2, including parallel processing, can be controlled at the program 5 level without providing a synchronization circuit or the like. The processing of the VU 1 and the PU 2 can be controlled in the cycles in which instruction codes are fetched, which is to say, in clock units. In a processor that has a plurality of VUs 1, parallel processing by the plurality of VUs 1 can be controlled in clock units at the program level.

When the VU 1 and the PU 2 need to be synchronized, this can also be performed at the program level by providing a synchronization instruction that waits for the end of a processing by a VU instruction. In the processor 10 of the present embodiment, synchronized processing where the VU 1 directly accesses the PU 2 can be defined using VU instructions that are separate to PU instructions. Accordingly, when developing and designing a VU 1 in accordance with the specification of an application, processing by the VU 1 that uses the resources of the PU 2 as required can be introduced as VU instructions without having to redesign or recompose the control sequence of the PU 2 that is composed of PU instructions in the program 5. Processing where no apparent time is taken by data transfers between the PU 2 and the VU 1 and synchronized processing where the hardware resources of both the PU 2 and the VU 1 are used can be flexibly introduced. By incorporating the hardware in the PU 2 in advance that is required for the VU 1 to perform such processing, it becomes no longer necessary to redesign the PU 2, and the general-purpose nature of the PU 2 is also not affected. In the processor 10 of the present embodiment, the PU control circuit 20 of the PU 2 is designed so as to cope with signals such as the resource access request signal REQ and the direct access commands CMD, and data buses, such as the VUWDATA data bus 31 and VURDATA data bus 32, that can make the resources of the execution unit 23 available are implemented.

Figure 4:
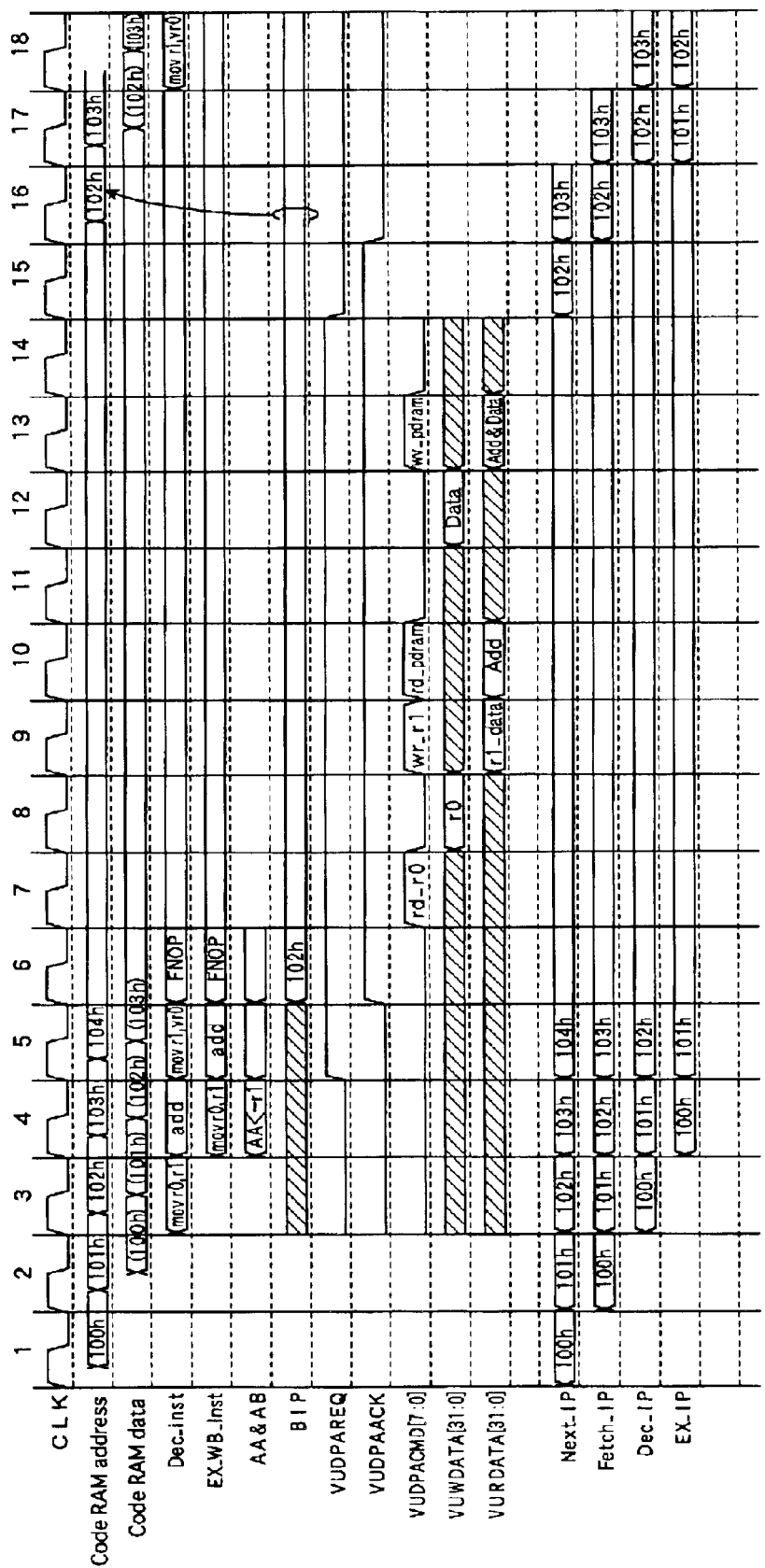
FIG. 4 is a timing chart for the execution of a VU instruction that directly accesses the PU.
Figure 5:
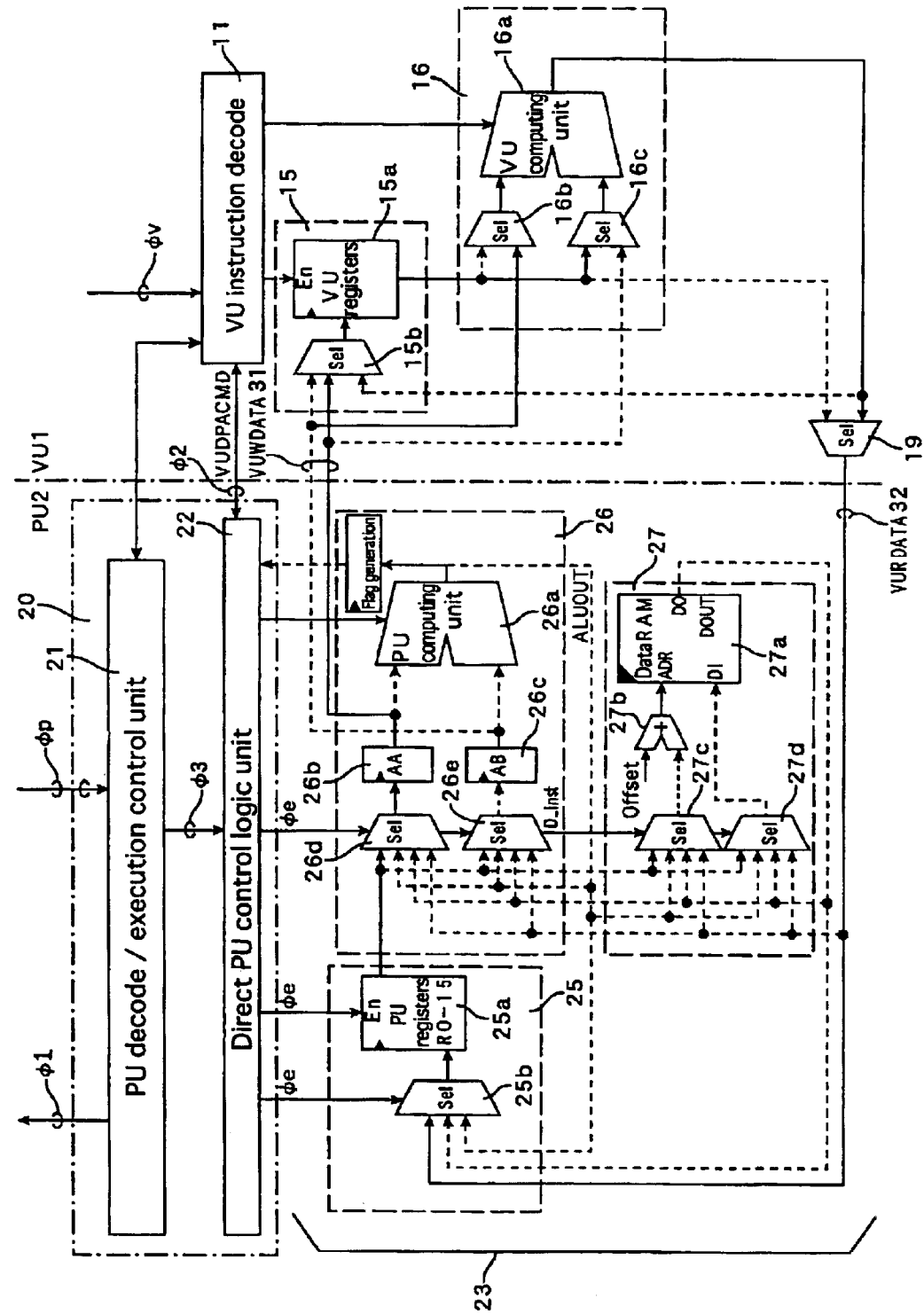
FIG. 5 shows the data path used when the VU directly accesses the PU and performs an input/output operation for the general-purpose registers.
Figure 6:
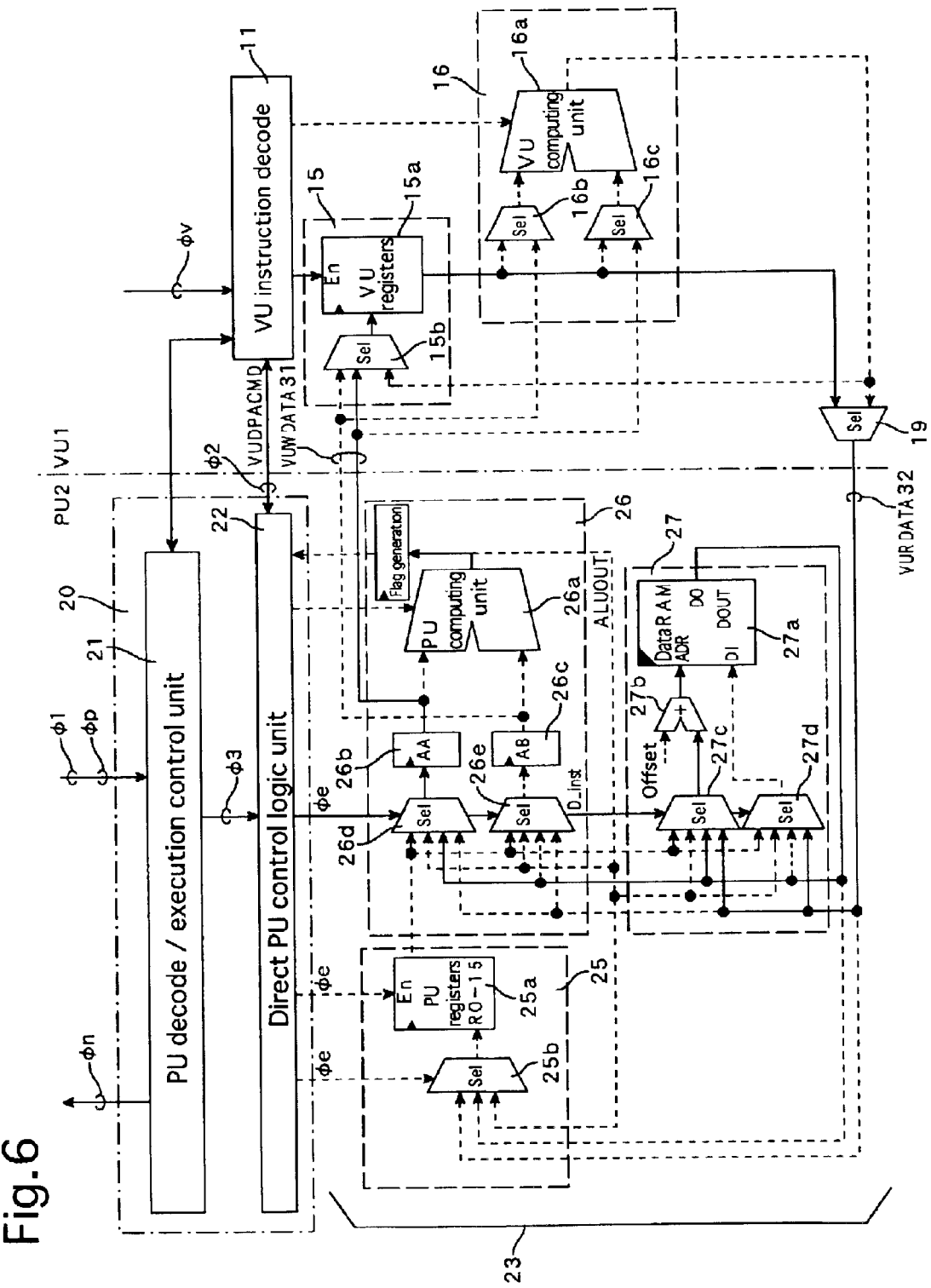
FIG. 6 shows the data path used when the VU directly accesses the PU and performs an input/output operation for the data RAM.

The following describes various cooperative operations performed in this VUPU processor 10 in more detail. FIG. 4 is a timing chart for the execution of a VU instruction that requests direct access. FIGS. 5 and 6 show the data flow when direct access is performed. In this example, the resource access request signal REQ (VUDPAREQ) is issued from the VU 1 to the PU 2 at the fifth clock. At this point, in the PU 2, the control signal (EX_WB_Inst) is outputted from the direct PU control logic unit 22 to the execution unit 23 according to the ADD instruction with the fetch address "101h", and the decode/execution control circuit 21 receives the MOVE instruction with the fetch address "102h" from the FU 3. Together with the execution of the ADD instruction, in the sixth clock, the fetch address "102h" of the next PU instruction is saved in the saving register BIP and the acknowledge signal ACK (VUDPAACK) is issued to the VU 1. As a result, the VU 1 issued the direct command VUDPACMD in the seventh clock The direct access command CMD (VUDPACMD) outputted in the seventh clock is an instruction that reads data from the register R0 in the general-purpose (PU) registers of the PU 2. Accordingly, in the eighth clock, the data in the register R0 is supplied from the VUWDATA data bus 31 to the VU 1. Next, in the ninth clock, a write instruction for the general-purpose register R1 is supplied to the PU 2 from the VURDATA data bus 32 along with data that has been processed by the VU 1.

FIG. 5 shows the data flow of this direct access processing. In the PU 2, the first general-purpose circuit 25, which includes the general-purpose registers (PU registers) 25a and the selector 25b, and the second general-purpose circuit 26, which includes the PU computing unit 26a, the input registers 26b and 26c, and the selectors 26d and 26e, operate as follows. Based on the signal φe outputted from the direct PU control logic unit 22 according to the direct access command CMD, the selector 26d is set so that the data in the register RO in the general-purpose registers 25a is outputted to the VUWDATA data bus 31. In the VU 1, the second special-purpose circuit 16 that includes the VU computing unit 16a and the selectors 16b and 16c operates as follows. Based on a signal from the VU decode/execution control circuit 11, the selector 16b is set so as to select the VUWDATA data bus 31 as an input and the selector 16c is set so as to select data in the VU registers 15a as an input. The VU computing unit 16a performs user-defined computation, and a 16-bit result (and flag information as necessary) is outputted from the VURDATA data bus 32 via the selector 19.

In the PU 2, the first general-purpose circuit 25, which includes the general-purpose registers (PU registers) 25a and the selector 25b, operates as follows. Based on the signal φe outputted from the direct PU control logic unit 22 according to the direct access command CMD, the selector 25b is set so that the data on the VURDATA data bus 32 is written into the general-purpose registers 25a. Accordingly, the result of the computation performed by the VU 1 using the data in the general-purpose registers 25a of the PU 2 is written back into the general-purpose registers 25a. In this way, the processing by which the VU 1 reads the general-purpose registers 25a of the PU 2, performs computation, and writes the result back into the general-purpose registers 25a is completed in three clocks. In the processor 10, when the VU 1 performs processing using the data of the PU 2, even this kind of processing can be executed by the VU 1 at high speed without overheads for the transfer of data from the PU 2 to the VU 1.

In the VU 1, according to the VU instruction, processing for inputting and outputting data to/from the data RAM 27a of the PU 2 is performed next to the input and output operation to/from the general-purpose registers 25a of the PU 2 by the VU 1. In the tenth clock, a direct access command CMD for reading data from the data RAM 27a is issued to the PU 2, and at the same time the address of the data to be read is supplied from the VURDATA data bus 32. In the twelfth clock, the data in the data RAM 27a is supplied to the VU 1 from the VUWDATA data bus 31 and is processed by the VU 1. After this, in the thirteenth clock, the result is supplied to the VURDATA data bus 32, a direct access command CMD for writing data into the data RAM 27a is supplied from the VU 1 to the PU 2, and the data outputted from the VU 1 is stored in the data RAM 27a.

FIG. 6 shows the data flow during this direct access processing. In the PU 2, the third general-purpose circuit 27, which includes the data RAM 27a, an adder 27b for adding an offset to an address, a selector 27c for selecting an address input, and a selector 27d for selecting a data input, operates as follows. Based on a signal φe outputted from the direct PU control logic unit 22 according to the direct access command CMD, the selectors 27c and 27d are set so as to input the data (address) from the VURDATA data bus 32, and the selector 26d of the second general-purpose circuit 26 is set so that the output of the data RAM 27a is outputted to the VUWDATA data bus 31 via the register 26b.

In the VU 1, the selector 15b of the first special-purpose circuit 15 is set so as to select the VUWDATA data bus 31 and write the data present on the VUWDATA bus 31 into the VU registers 15a. The output of the VU registers 15a is also set so as to be outputted via the selector 19 to the VURDATA data bus 32, in the tenth clock a read address only is outputted to the VURDATA data bus 32, and in the thirteenth clock a read address and data are outputted.

As described above, data transfers between the data RAM 27a of the PU 2 and the VU registers 15a of the VU 1 can be performed without using the general-purpose registers 25a of the PU 2 or registers that are shared between the VU 1 and the PU 2. This means that data can be inputted and outputted between the VU 1 and the PU 2 using the minimum number of clocks that are required for inputting and outputting data to and from the data RAM 27a, and that a large reduction can be made in the number of clocks consumed by such processing. When such processing is performed, the PU 2 is held up by the processing of the VU 1, so that the processing of the PU 2 is unable to proceed, but in cases where data needs to be transferred between the PU 2 and the VU 1, a reduction is made in the time consumed in the PU 2 by such transfers, so that as a result, a reduction can be made in the processing time taken by the PU 2. Since processing that transfers data via the general-purpose registers 25a or the like can be omitted, a large improvement is made in the processing efficiency of the PU 2.

As described above, when the processing that is executed according to a VU instruction that requests direct access is processing that inputs and outputs data to and from each of the general-purpose registers 25a and the data RAM 27a of the PU 2, in the fifteenth clock when such processing is complete, the resource access request signal REQ is inverted and so is set at the low level. The signal produced by inverting the resource access request signal REQ (VUDPAREQ) is the request clear signal END (VUDPAEND). On receiving the request clear signal END, in the sixteenth clock the PU 2 inverts the acknowledge signal ACK (VUDPAACK) and the VU 1 is informed that VU 1 has been released from control over the PU 2. Also, in the sixteenth clock, the fetch address "102h" that was stored in the saving register BIP is outputted from the FU 3, and the processing according to the PU instructions that was interrupted by the direct access request sent from the VU 1 is resumed.

Figure 7:
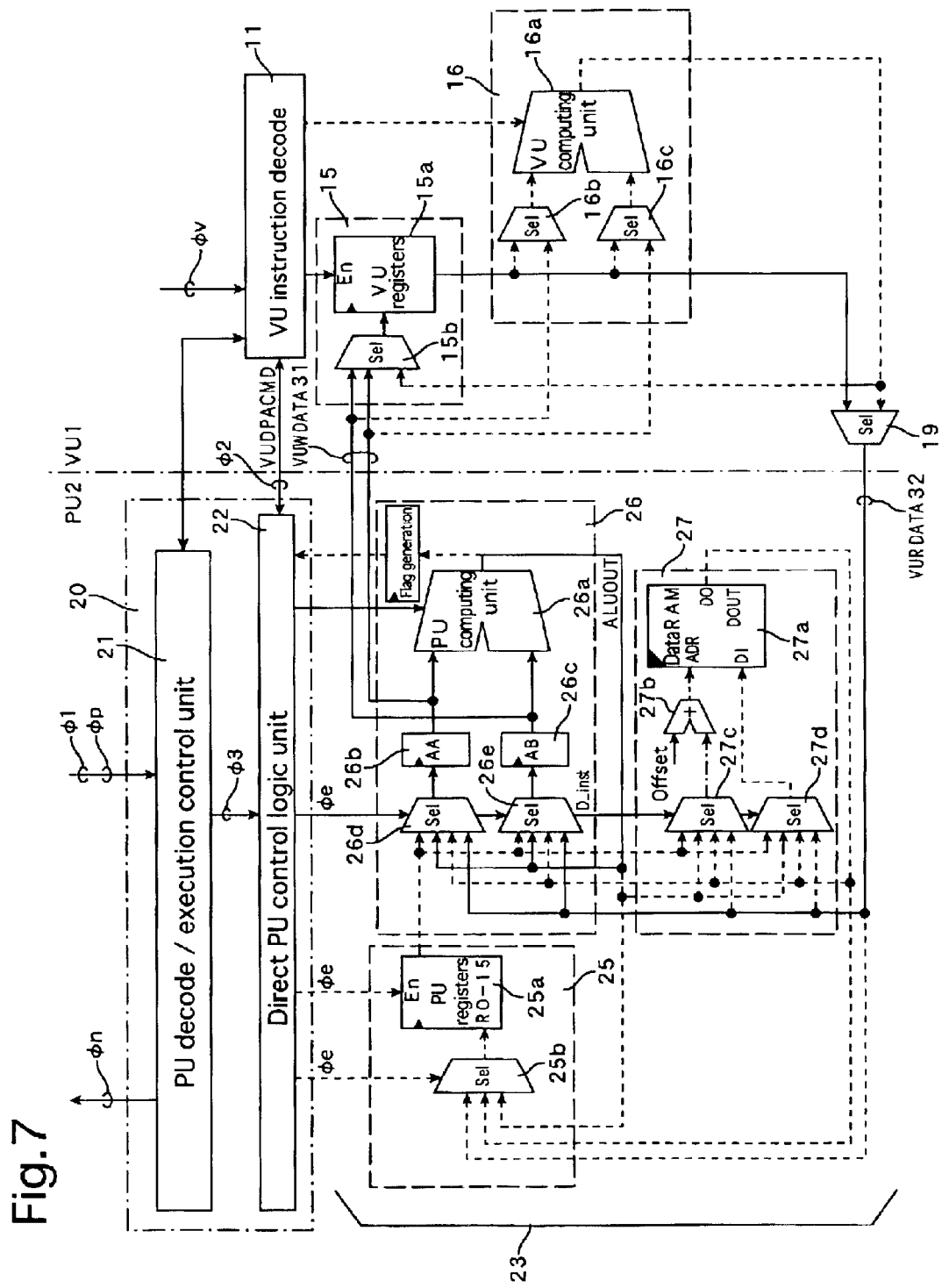
FIG. 7 shows the data path used when the VU directly accesses the PU and performs an input/output operation for the general-purpose computing unit.

FIG. 7 shows the data flow when the computing unit of the PU 2 is directly used by the VU 1 as another example of an important case where a direct access request is generated for the PU 2. The PU 2 is a basic instruction executing unit, and is a predefined unit that provides a fixed set of functions regardless of the functions of the VU 1. Accordingly, by making it possible for the VU 1 to use the computing unit of the PU 2, it is possible to omit hardware resources of the VU 1 for computational functions that can be covered by the computing unit of the PU 2.

In the second general-purpose circuit 26 of the PU 2, a data path is formed so that the data on the $0^{th}$ to $15^{th}$ bits of the VURDATA data bus 32 and the data on the $16^{th}$ to $31^{st}$ bits of the VURDATA data bus 32 that are outputted from the VU 1 are respectively assigned to the input ports A and B of the computing unit 26a of the PU 2 and computation is executed by the computing unit 26a of the PU 2. A data path whereby the output of the computing unit 26a is supplied to the VU 1 via the VUWDATA data bus 31 is also formed.

With the above configuration, data paths by which the VU 1 can input and output data to and from the computing unit 26a are formed, and processing whereby data in the VU registers 15a of the VU 1 is used in computation by the computing unit 26a and the result is written back into the VU registers 15a can be executed. In this way, an environment is provided in which the computing unit 26a of the PU 2 can be used without stress, so that the various computational functions of the computing unit 26a can by used by VUs 1 and the freedom of user logic which can be implemented by the VU instruction in VUs 1 are greatly increased. Such freely designed special-purpose instructions (VU instructions) can be executed at high speed without clocks being consumed by data transfers. Accordingly, it is possible to provide a low-cost, compact processor or system LSI that has high flexibility for handling a specification demanded by a user or an application and has a high execution speed that is suited to real-time processing.

By providing the PU control circuit 20 of the PU 2 with a function that can make the execution unit 23 available in accordance with a direct access request from the VU 1 and has the execution unit 23 controlled by direct access commands issued by the VU 1, the PU 2 can be provided with a second mode, whereby the PU 2 operates according to instructions from the VU 1, in addition to the first mode, whereby the PU 2 operates according to PU instructions supplied from the FU 3. In the second mode, some of the resources of the PU 2 can be made available to the VU 1, and the resources of the PU 2 can be incorporated as part of a data path for executing processing in the VU 1. As described above, the user can specify a direct access instruction that directly accesses the PU 2 as a VU instruction, and data transfers between the VU 1 and the PU 2 can be performed without MOVE instructions. Also, computation using the computing unit of the VU 1, computation using the computing unit of the PU 2, and accesses to the data RAM of the PU 2 can be performed without clocks being wasted. This means that a large improvement can be made in the processing efficiency of a processor (VUPU processor) 10 that has a PU 2 including general-purpose functions as a platform and is equipped with a VU 1 for realizing user logic. In cases where there are short time required user instructions (VU instructions) for which processing by the VU 1 with data of the PU 2 is completed in a few clocks, data transfers would be frequently performed if the present invention were not used and the effect of the invention is especially prevalent. The invention does not mean, however, that other user defined standard instructions for purposes such as transferring data cannot be defined, so that MOVE instructions and the like for transferring data between the general-purpose registers 25a of the PU 2 and the VU registers 15a of the VU 1 can also be used.

The processes for which the largest gain is achieved by the second mode where the resources of the PU 2 are used by the VU 1 are input/output processes for the general-purpose registers 25a of the PU 2, processes that use the general-purpose computing unit 26a, and input/output processes for the data RAM 27a, with the PU 2 of the present embodiment being provided as described above with data paths for inputting and outputting data in accordance with these processes. The configurations of these data paths are not restricted to the circuits disclosed above, but by providing some circuits for the same purpose as standard in the PU 2, the PU 2 can function as a platform for a processor 10 that is equipped with a VU 1 where direct access instructions can be used as VU instructions. Also, when the above configuration is used, the range of the specifications that can be implemented by VUs 1 and a VUPU processor 10 can be expanded without sacrificing the general-purpose nature of the PU 2. This means that a processor with even greater flexibility and faster processing can be provided.

In the present embodiment, the direct access command CMD from the VU 1 is decoded at the level of the direct PU control logic unit 22 of the PU control circuit 20 in the PU 2 and the execution unit 23 is controlled by the VU 1, though the level at which the direct access command CMD is decoded is not restricted to this. For example, the direct access command CMD may be supplied from the VU 1 to the PU 2 at the same level as the PU instructions φp that are supplied from the FU 3. In this case, the PU control circuit 20 does not need to be divided into stages composed of the decode/execution control circuit 21 and the direct PU control logic unit 22, so that the structure of the PU 2 may become simple. However, this results in conflict between the PU instructions supplied from the FU 3 and the direct access command CMD, so that compared to the example described earlier where there is conflict with the third instructions φ3 at a closer level to the execution unit 23, the timing at which the PU 2 switches to the second mode is slow. Accordingly, in order to prioritize the processing speed of the VU 1 and improve the efficiency of real-time processing, an architecture like the present embodiment where the direct access command CMD is processed at as close a control stage as possible to the execution unit 23 of the PU 2 is preferable.

As described above, the present VUPU processor includes a VU that is implemented in accordance with a user specification or the like by converting processes that need to be executed at high speed into special-purpose circuits, and a PU that supports general-purpose functions, such as error handling. The VUPU processor is flexible enough to handle changes in a specification or the like according to a program. As a result, the processor offers both a programmable flexibility and high-speed processing through the use of special-purpose circuits. Users can design the VU themselves, making the processor a semi-customizable processor where user instructions can be implemented as VU instructions with a high degree of freedom. This means that high-performance system LSIs can be developed and manufactured as application-specific processors in an extremely short time and at low cost.

With the present invention, the PU is provided with an architecture that enables the VU to directly access the registers and data RAM of the PU on an instruction command basis, and instructions that release the resources of the PU for the VU can be implemented as VU instructions. Accordingly, when data processing is constructed around the VU, there are the effects that clocks are not consumed unnecessarily, control becomes easier, performance is improved, and less time is required for development.

In more detail, conventionally at least one extra clock is consumed when data is transferred between the PU and the VU via a register, with a total of at least two extra clocks being consumed when the data is transferred one way and then back. When processing is performed using the resources of the PU, the processing conventionally needs to be performed by executing a PU instruction, and the data needs to be temporarily moved from the VU to the PU. Accordingly, having the VU perform processing using the data or resources of the PU has conventionally led to a decrease in processing speed and the need to use a complex control procedure, as well as a marked drop in the efficiency with which processors can be developed. On the other hand, with the VUPU processor of the present invention, it is possible to effectively eradicate the overheads that are required for the transfer of data between the VU and the PU, so that the processing time of the VU can be further shortened, and a processor that is even more suited to applications, such as image processing and network processing, that require real-time response can be provided. In addition, by making the resources of the PU available to the VU, it becomes possible for the functions of the PU to be used as part of the VU instructions, which is to say, as part of the user instructions, so that VU instructions can be implemented with even greater freedom without increasing the resources of the VU. With the data processing system of the present invention, a processor or system LSI that offers both greater flexibility and higher speed can be provided, so that a data processing apparatus that is even more suited to network processing and image processing applications can be provided according to the present invention.

In order to realize this effect, the present invention provides the PU with a function for receiving direct access requests and a function or port for receiving direct access instructions or commands, and also provides the PU with control logic corresponding to these functions, thereby composing an architecture capable of being used as a platform. To use this architecture, the VU may be provided with a function for generating direct access request signals or generating instruction commands. If the functions that relate to the present invention are not necessary and conventional MOVE instructions are sufficient for transferring data, the VU may be designed with a conventional specification, so that while the burden to the user of designing and developing a VU is not decreased, the burden is neither increased.

What is claimed is:

1. A data processing system comprising:
   a special-purpose processing unit including dedicated circuit that is suited to special data processing;
   a general-purpose processing unit that is suited to general-purpose data processing; and
   a fetch unit for supplying, when an instruction code fetched from a code memory is a special-purpose instruction that specifies processing to be performed by the special-purpose processing unit, the special-purpose instruction to the special-purpose processing unit, and supplying, when the fetched instruction code is a general-purpose instruction that specifies processing by the general-purpose processing unit, the general-purpose instruction or a decoded data of the general-purpose instruction to the general-purpose processing unit;
   wherein the general-purpose processing unit is equipped with a first mode for operating based on a first instruction from the fetch unit and a second mode for operating based on a second instruction from the special-purpose processing unit;
   wherein the general-purpose processing unit includes an execution unit for executing data processing and a control unit for controlling the execution unit based on any of the first instruction and the second instruction; and
   wherein the control unit, on receiving a signal that requests the second mode prior to the second instruction from the special-purpose processing unit, ends processing in the execution unit that is based on a preceding first instruction, stores an address for fetching a general-purpose instruction that follows the first instruction, and outputs a signal for permitting the special-purpose processing unit to issue the second instruction.

2. A data processing system comprising:
   a special-purpose processing unit including a dedicated circuit that is suited to special data processing;
   a general-purpose processing unit that is suited to general-purpose data processing; and
   a fetch unit for supplying, when an instruction code fetched from a code memory is a special-purpose instruction that specifies processing to be performed by the special-purpose processing unit, the special-purpose instruction to the special-purpose processing unit, and supplying, when the fetched instruction code is a general-purpose instruction that specifies processing by the general-purpose processing unit, the general-purpose instruction or a decoded data of the general-purpose instruction to the general-purpose processing unit;
   wherein the general-purpose processing unit is equipped with a first mode for operating based on a first instruction from the fetch unit and a second mode for operating based on a second instruction from the special-purpose processing unit;
   wherein the general-purpose processing unit includes an execution unit for executing data processing and a control unit for controlling the execution unit based on any of the first instruction and the second instruction; and
   wherein the control unit includes:
   a decode/execution control unit for decoding the first instruction; and
   a control logic unit for selecting, according to an indication from the decode/execution control unit, one of a third instruction from the decode/execution control unit and the second instruction, and converting the selected instruction into a control signal for logical and computing elements that compose the execution unit.

3. A data processing system comprising:
   a special-purpose processing unit including a dedicated circuit that is suited to special data processing;
   a general-purpose processing unit that is suited to general-purpose data processing; and
   a fetch unit for supplying, when an instruction code fetched from a code memory is a special-purpose instruction that specifies processing to be performed by the special-purpose processing unit, the special-purpose instruction to the special-purpose processing unit, and supplying, when the fetched instruction code is a general-purpose instruction that specifies processing by the general-purpose processing unit, the general-purpose instruction or a decoded data of the general-purpose instruction to the general-purpose processing unit;
   wherein the general-purpose processing unit is equipped with a first mode for operating based on a first instruction from the fetch unit and a second mode for operating based on a second instruction from the special-purpose processing unit;
   wherein the general-purpose processing unit includes an execution unit for executing data processing and a control unit for controlling the execution unit based on any of the first instruction and the second instruction; and
   wherein the execution unit includes at least one of:
   a data path that enables an input/output operation for general-purpose registers to be performed for data from the special-purpose processing unit;

a data path that enables an input/output operation for a computing unit of the general-purpose processing unit to be performed for data from the special-purpose processing unit; and a data path that enables an input/output operation for a data RAM of the general-purpose processing unit to be performed for data from the special-purpose processing unit.

4. A control method for a data processing system that includes a special-purpose processing unit including a dedicated circuit that is suited to special data processing, a general-purpose processing unit that is suited to general-purpose data processing, and a fetch unit for supplying, when an instruction code fetched from a code memory is a special-purpose instruction that specifies processing to be performed by the special-purpose processing unit, the special-purpose instruction or a decoded data of the special-purpose instruction to the special-purpose processing unit, and supplying, when the fetched instruction code is a general-purpose instruction that specifies processing by the general-purpose processing unit, the general-purpose instruction or a decoded data of the general-purpose instruction to the general-purpose processing unit, the control method comprising:

a first step in which the general-purpose processing unit operates based on a first instruction from the fetch unit;

a second step in which the general-purpose processing unit operates based on a second instruction from the special-purpose unit; and a third step of ending, when a signal that requests the second step is received from the special-purpose processing unit before the second step starts, the processing based on the preceding first instruction, storing an address for fetching a general-purpose instruction that follows the first instruction, and outputting a signal for permitting the special-purpose processing unit to issue the second instruction.

5. A control method according to claim 4, wherein the general-purpose processing unit includes an executing unit for executing data processing, a decode/execution control unit for decoding the first instruction and outputting a third instruction, and a control logic unit for converting the third instruction into a control signal for logical and computing elements that compose the execution unit, and in the second step, the control logic unit converts the second instruction into a control signal for the logical and computing elements that compose the execution unit.

6. A control method according to claim 4, wherein in the second step, at least one of:

processing that inputs and/or outputs data to and/or from general-purpose registers of the general-purpose processing unit;

processing that performs computation using a computing unit of the general-purpose processing unit; and processing that inputs and/or outputs data to and/or from a data RAM of the general-purpose processing unit, is executed.

* * * * *